UNITED STATES PATENT OFFICE.

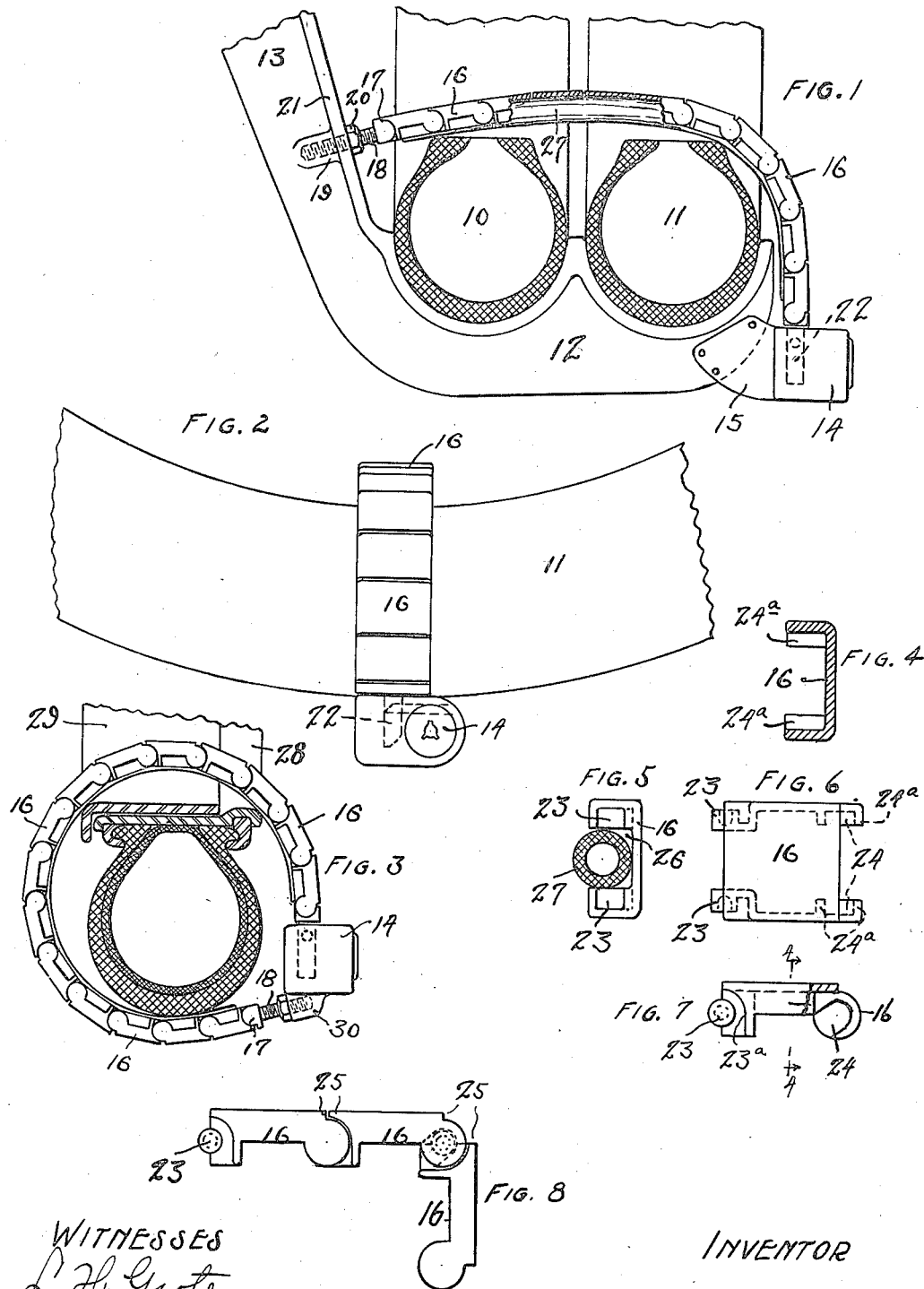

ABEL E. CHERNACK, OF PROVIDENCE, RHODE ISLAND.

TIRE-GUARD.

1,170,477.  Specification of Letters Patent.  Patented Feb. 1, 1916.

Application filed March 5, 1915. Serial No. 12,358.

*To all whom it may concern:*

Be it known that I, ABEL E. CHERNACK, a subject of the Emperor of Russia, and residing in the city of Providence, county of Providence, and State of Rhode Island, have invented a certain new and useful Improvement in Tire-Guards, of which the following is a specification.

The present invention relates to tire guards and particularly to a device intended to secure against theft spare tires carried on an automobile.

In the accompanying drawings, Figure 1 is a cross section, partially broken away, through a pair of tires carried upon a suitable bracket and in connection with which the present guard is illustratively embodied in one form; Fig. 2 is a side elevation thereof; Fig. 3 is a cross section similar to Fig. 1 but applied to a tire support of different character; Fig. 4 is a cross section through one of the links of the present guard and taken on the line 4—4, Fig. 7; Fig. 5 is an end elevation of a link; Fig. 6 is a plan thereof; Fig. 7 is a side elevation; and Fig. 8 shows a portion of the chain with one of the links in position assumed just after its engagement with the adjacent link.

I am aware that flexible guards such as leather-covered chains have been provided for securing spare tires against theft from their support on an automobile. So far as I am aware however, these chains have been of rather weak construction, easily cut and affording no great security against theft. Another type comprises solid castings, which are more secure but have to be adapted to each construction of tire and a great variety of different patterns must be used to meet the great variety of spare tires or wheel constructions.

The object of my invention is to provide a chain which shall not only hold the tires securely in position upon their support, to prevent rattling, but also to so construct the chain that it will protect the tires from mechanical injury due to friction with the guard and also protect them against theft by reason of the peculiar construction of the chain itself and its supporting ends.

Another and most important feature of the invention is that the guard is of such construction that it may be universally employed on any type of spare tire, spare rim, or spare wheel construction because of its adaptability to be lengthened or shortened by merely adding or removing individual links.

In Fig. 1 of the accompanying drawings I have shown a pair of tires 10 and 11 carried in a bracket 12 of common construction, the shank 13 of which is secured in well known manner to the body or frame of the automobile. Extending from this shank 13 to a lock 14, mounted through bracket 15 at the outer end of the main bracket 12, I now provide a chain comprising links 16 of the peculiar shape shown in Figs. 4 to 7. At one end I attach to the terminal link a special securing block 17 having a screw 18 in extension thereof adapted to be threaded into a threaded socket 19 in the shank 13 and locked in adjusted position by the lock nut 20. To insert the screw 18 it is necessary to rotate the securing block 17 on its axis and obviously this cannot be done after the guard chain has been positioned unless the free end thereof is detached from the lock 14. Where it is inconvenient to provide a threaded socket 19, it is sufficient to pass the screw 18 through a tapped flange 21 on the bracket. The opposite end of the chain carries through its terminal link 16 a bolt 22 which enters the lock 14 and is engaged by the locking bolt thereof. In detail each link 16, which is stamped out of sheet metal and case hardened, comprises at one end inwardly offset pivot pins 23 on opposite sides thereof which take into corresponding recesses 24 in the adjacent end of the next link. These recesses 24 are open at their lower ends so that the pins 23 may be freely inserted therein when the links lie at an angle to each other, while it is impossible to detach the links when they lie in extension of each other or in any angular position less deflected from the position in extension than the right angular position shown in Fig. 8, by reason of the fact that the adjacent cheeks 23$^a$ and 24$^a$ prevent the escape of the pins 23 from the slots 24. Shoulders 25 at the adjacent ends of connected links form abutments which prevent the chain from being bent except in the one direction. The links are recessed in the mid-portion of their lower faces to afford an uninterrupted longitudinal channel 26 in which may be positioned a resilient member such as a rubber tube 27 extending the length of the guard chain and thus bearing against the tires 10 and 11 when the guard is in position.

In Fig. 3 I have shown the application of the invention to a spare tire carried on a detachable rim 28. The mounting 29 for this is permanently fastened to the body of the car in the ordinary manner and the guard chain forms a bracelet incasing the spare tire and rim and passing through the support 29. In this construction the lock 14 is provided with a boss 30 having a threaded socket to receive the screw 18 of the lock bar 17. In other respects the device is similar to that shown in Fig. 1.

The present guard is of special value since it may be adapted to various sizes of tires by the insertion or removal of individual links 16. The retailer has merely to carry a supply of links 16 and of locks 14 in the two types shown in Figs. 1 and 3 to enable him to meet the requirement of any construction of tire, or spare rim and tire, mounted on automobiles of various makes. The links are of tempered steel so that they cannot be broken and it is impossible to detach them when the device is in position. It would be impossible even by cutting out one of the tires—say the tire 10, in Fig. 1—to obtain sufficient slack to enable the links to be brought into disengaging position so long as the offset ends thereof are secure in their attachments. The rubber tubing which protects the tire against rubbing by the guard and also binds the links, preventing their rattling, is readily obtained and is particularly efficient as a protector. It may be carried in long lengths and cut to the particular requirements of the guard according to the length of the latter.

I claim as my invention:

1. A chain for a tire guard or the like, comprising a series of interengaged links of recessed on one face to form a continuous open channel, in combination with a cushioning element lying in said channel and extending beyond said face of the chain to form a bearing surface.

2. A chain for a tire guard or the like, comprising a series of readily-detachable interengaged links recessed on one face to form a continuous open channel, in combination with a cushioning element lying in said channel and extending beyond said face of the chain to form a bearing surface.

3. A chain for tire guards or the like, comprising a series of interengaged links of like shape, recessed to form a channel uninterruptedly open to one face of the chain, in combination with a cushioning element lying in said channel and extending beyond said face of the chain to form a bearing surface, substantially as described.

4. A chain for a tire guard or the like, comprising a series of interengaged links, the joints between the links being of such construction that the chain can be bent in only one direction, said links being recessed on the inner face of the chain to form a continuous open channel, in combination with a cushion element lying in said channel and extending beyond said face to form a bearing surface.

5. A chain for tire guards or the like, comprising a series of interengaged links of like shape, a terminal link at one end having a screw extension and a terminal link at the opposite end having a locking bar extension, in combination with a lock having a threaded connection with said screw on the one hand and a locking bolt adapted to engage the inserted chain bar, substantially as described.

6. A tire guard comprising a chain having readily detachable links, pivotal connections between adjacent links permitting the chain to bend in one direction only, and means at the opposite ends of the chain for securing the latter in such adjusted position that the links cannot be detached even when the chain is moderately slack together with cushioning means on the inner face of the chain and extending beyond the latter to form a bearing surface.

7. A tire guard comprising a chain having readily detachable links recessed on one face to form an uninterrupted channel, a continuous flexible bearing member lying in said channel and extending beyond the face of the chain, and means at the opposite ends of the chain for securing the same in adjusted position.

8. A tire guard comprising a chain having readily detachable links having concealed pivotal connections and recessed on one face to form an uninterrupted channel, together with a continuous flexible member lying in said channel, and means at the opposite ends of the chain for securing the same in adjusted position.

9. A tire guard comprising a chain having independent, readily-detachable interengaging links recessed on one face to receive a cushioning member, in combination with readily detachable cushioning means engaged in said recesses and projecting beyond said face to form a bearing member.

10. A tire guard comprising a chain having independent, detachable links of hardened stamped metal and readily detachable cushioning means on one face of the chain.

11. A chain for tire guards or the like, comprising a link having a body portion and substantially parallel side portions extending in the same direction from the opposite margins thereof, a socket portion at the corresponding end of each side and a stud portion at the opposite end of each side adapted to take into the socket portion of an adjacent link, all the walls of said link being of substantially uniform thickness, and the sides of the link being spaced apart to afford a channel open to one face of the chain and continuous in a series of interengaged links.

In testimony whereof I have signed my name to this specification, in the presence of two subscribing witnesses.

ABEL E. CHERNACK.

Witnesses:
WALTER ABBE,
L. H. GROTE.